Patented July 29, 1952

2,605,247

UNITED STATES PATENT OFFICE 2,605,247

ARTIFICIAL LEATHER PRODUCT FROM A BUTADIENE - ACRYLONITRILE COPOLYMER, CALCINED CLAY, AND POLYVINYL CHLORIDE RESINS, AND PROCESS OF PRODUCING SAME

Elmer C. Schule, Pottstown, Pa., assignor to The Firestone Tire & Rubber Company, Akron, Ohio, a corporation of Ohio No Drawing. Application June 17, 1950, Serial No. 168,835

8 Claims. (Cl. 260—41.5)

This invention relates to a simulated leather product comprising a vinyl chloride resin, a butadiene-acrylonitrile copolymer, and calcined clay, and to a method of compounding and fabricating the same.

It has heretofore been proposed to manufacture simulated leather products from blends of vinyl chloride resins and butadiene-acrylonitrile copolymers. In such compositions, the butadiene-acrylonitrile copolymer acts as a plasticizer for the resins, making it possible to dispense with the greater part of the liquid plasticizers commonly used in such products. Avoidance of liquid plasticizers is highly desirable, both to minimize varnish lift and other untoward effects due to migration of the plasticizer and also to prevent changes in properties of the materials due to volatilization of the liquid plasticizers. As heretofore prepared, however, these simulated leather products have tended to have a roughened surface configuration, due to the "nerve" of the butadiene-acrylonitrile rubber. Likewise they have been deficient in point of tear resistance and tensile strength. Experiments have been conducted by the present applicant with a view to improving these properties by the addition of loading agents; however, the generality of loading agents produced no great improvement and usually caused the products to surface-craze on stretching.

Accordingly it is an object of this invention to provide simulated leather products of improved properties from blends of butadiene-acrylonitrile copolymers and vinyl chloride resins.

Another object is to provide such products having a smooth surface, undistorted by strains due to the nerve of the butadiene-acrylonitrile copolymer.

A further object is to provide products of the aforesaid improved properties by the incorporation of certain inert fillers therein.

A still further object is to provide such products free from a tendency to craze upon stretching.

A still further object is to provide a novel process for the manufacture of the above desirable products.

Synopsis of the invention

The above and other objects are secured, in accordance with this invention by the incorporation, in accordance with a special procedure, of calcined clay into simulated leather products based on blends of vinyl chloride resins with butadiene-acrylonitrile copolymers. The proportions of materials to be employed are as follows:

| | Per cent |
|---|---|
| Vinyl chloride resin | 60 to 80 |
| Butadiene-acrylonitrile copolymer | 10 to 15 |
| Calcined clay | 10 to 25 | these percentages being on the basis of the total weight of vinyl chloride resin, butadiene-acrylonitrile copolymer and calcined clay. In turn, the total weight of these three ingredients constitutes at least 65% of the total weight of the product, the balance being constituted of miscellaneous compounding ingredients such as pigments, plasticizers, heat- and light-stabilizers, moisture-proofing agents and the like.

The special procedure for incorporating the calcined clay involves first cold-milling together the butadiene-acrylonitrile copolymer and calcined clay until thorough dispersion is obtained. This preliminary mix is then hot-milled with the vinyl chloride resin. Unless this procedure is followed, the benefits of the use of the specific loading agent, calcined clay, are not secured, and moreover the final product crazes badly on stretching.

The composition prepared as above described is hot-calendered to form the final simulated leather sheet product. The calendering proceeds smoothly, without difficulties due to "wildness" or nerve of the stock, to yield simulated leather products characterized by smooth finish, high tensile strength, high tear strength and freedom from craze on stretching.

The vinyl chloride resin

The vinyl chloride resins are a well-known class of materials consisting of the simple polymers of vinyl chloride and copolymers of vinyl chloride in which the essential vinyl chloride polymer chain is interspersed at intervals with the residues of other monoethylenically unsaturated compounds or conjugated diethylenically unsaturated compounds which have been copolymerized therein. In general, the essential character of the vinyl chloride polymer is unchanged, aside from a certain desirable increase in processability and flexibility, by the copolymerization therein of up to 20%, based on the total weight of the copolymer, of these extraneous unsaturated compounds. Suitable compounds for copolymerization with vinyl chloride include; for instance vinyl esters on the order of vinyl bromide, vinyl fluoride, vinyl acetate, vinyl chloroacetate, vinyl butyrate, other higher fatty acid vinyl esters, vinyl alkyl sulfonates and the like; vinyl alkyl ethers such as vinyl ethyl ether, vinyl isopropyl ether, vinyl chloroethyl ether and the like; cyclic unsaturated compounds such as styrene, the mono and poly (nuclearly) chlorinated styrenes, coumarone, indene, vinyl naphthalene, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds such as vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated ethylenically di-unsaturated compounds such as butadiene, isoprene, chloroprene, 2,3-dimethyl-1,3-butadiene, piperylene and the like. For a fairly complete list of materials known to polymerize with vinyl chloride, reference may be had to Krczil, "Kurzes Handbuch der Polymerisationstechnik—II Mehrstoff Polymerisation," Edwards Bros. Inc., 1945, pp. 735–37, the items under "Vinylchlorid." In general, the criterion of a practical comonomer for use with vinyl chloride to produce copolymers containing 80% or more vinyl chloride is that, on a mole percentage basis, an initial charge of 96% vinyl chloride, balance comonomer, shall yield an initial comonomer containing (a) at least 90% vinyl chloride and (b) not more than 99% vinyl chloride. On this basis, satisfactory comonomers for use with vinyl chloride will be those having "$Q_2$" and "$e_2$" values as described in J. Polymer Science 2:101 correlated as follows, assuming that for vinyl chloride $Q_1=.03$ and $e_1=0.3$ $$4.1 > \frac{\frac{0.29e^{-.3(.3-e_2)}}{Q_2}+.04}{1.33 Q_2 e^{e_2(.3-e_2)}+.96} > .37$$

Instead of the single unsaturated comonomers of the types above indicated, mixtures of such comonomers may enter into the copolymers, it being understood that the total quantity thereof shall be small enough (i. e., not over 20%, based on the weight of copolymer) that the essential character of the polyvinyl chloride chain is unaltered.

The butadiene-acrylonitrile copolymer

The butadiene-acrylonitrile copolymers employed in the practice of this invention are elastomeric materials available commercially from a number of sources. In general, for most satisfactory results in the practice of this invention, there should be employed copolymers of this type which are rather high in acrylonitrile content, i. e., containing from 30% to 45%, based on the weight of the copolymer, of acrylonitrile, the balance being butadiene. Acrylonitrile may be replaced in these copolymers by methacrylonitrile. Suitable commercial copolymers are available on the market under the trade names of "Hycar OR" (Hycar Chemical Co.) and "Butaprene N" (Xylos Rubber Co.).

The calcined clay

Suitable materials of this type are produced by calcining clays, preferably purified of all non-argillaceous materials, at temperatures such as to completely expel the water of hydration but below the sintering point of the clay employed. Such calcined clays are commercially available from many sources, typical examples being the products marketed under the name "Whitetex" (highly purified material) and "Pigment No. 33" (a less pure material) by the Moore and Munger Co.

The preliminary mixing of butadiene-acrylonitrile copolymer and calcined clay The preliminary mixing of the butadiene-acrylonitrile copolymer and calcined clay may be accomplished in any equipment capable of exerting a strong kneading and close-clearance-shearing action upon the butadiene-acrylonitrile copolymer. In practice, either the well-known roll mill or the Banbury mixer may be used for this step. Important points of the preliminary milling are (1) that it shall be conducted in the cold (i. e. not above about 130° F.) at least until dispersion of the copolymer and calcined clay is complete and (2) the amount of copolymer relative to the capacity of the milling equipment shall be large enough so that the copolymer-clay mixture will receive a thorough shearing and milling action. These requirements will generally make it more convenient to employ separate milling facilities for the initial cold-milling of the butadiene-acrylonitrile copolymer with the calcined clay and for the final hot-milling of the complete composition, although theoretically it would be possible to raise the temperature of the mill after the initial mixing had been completed, and thereafter to mill in the other ingredients in the final hot-milling step. Miscellaneous compounding ingredients, plasticizers and stabilizers may be incorporated during this preliminary mixing, although preferably any plasticizing agents should be withheld until after thorough blending of the calcined clay and butadiene-acrylonitrile copolymer has been achieved.

The final hot milling step

The preliminary mixture prepared as above described is then hot-milled with the other ingredients at temperatures from 290° F. to 345° F. This step may be carried out on heated roll mills, or preferably in a heated Banbury mill, and again the quantity of materials handled should be close to the capacity of the mill so as to insure complete malaxation thereof. The order of addition is immaterial, it being possible to soften and break down the vinyl chloride resin initially, and thereafter to add the previously prepared mixture of butadiene-acrylonitrile copolymer and calcined clay, or vice versa, the previously prepared mixture may be charged into the mill first, and thereafter the vinyl chloride resin may be charged. Other ingredients, such as pigments, plasticizers and stabilizers may likewise be added during this step.

When the final milling step is completed, the compound is calendered out into a leather-like sheet usually from .01 inch to .2 inch thick. The calendering apparatus is preferably maintained at rather high temperatures on the order of 310° to 335° F. The calendered sheet will be found to have accepted the calender finish smoothly (i. e., will be smooth, or will faithfully reproduce the contour of any pattern roll employed) and will not be rough and distorted due to residual strains. The resultant sheet will not craze upon stretching as is the case when other pigments than calcined clay are used, or indeed when calcined clay itself is not incorporated by the special procedure outlined above. The sheet will also have excellent tear strength, an important feature in any artificial leather product. The sheet product of this invention will also have all of the advantages (hitherto unrealizable in commercial practice, due to the difficulties of roughness, crazing poor tear strength above mentioned) attendant upon the use of butadiene-acrylonitrile copolymers to replace all or part of the liquid plasticizers ordinarily employed, namely avoidance of varnish lift and property changes due to the fugitive nature of liquid plasticizers.

With the foregoing general discussion in mind, there are given herewith detailed examples of the practice of this invention. All parts given are by weight.

EXAMPLE I

| Preliminary mix: | Parts by weight |
|---|---|
| Butadiene-acrylonitrile copolymer (containing 35% acrylonitrile) | 245 |
| Precipitated hydrated calcium silicate | 45 |
| "Silene EF" manufactured by the Columbia Chemical Division, Pittsburgh Plate Glass Co.) | |
| Calcium stearate | 7.5 |
| Calcined clay | 304 |
| ("Whitetex" manufactured by Moore & Munger Inc.) | |

| Final mix: | |
|---|---|
| Preliminary mix | 149.0 |
| Polyvinyl chloride | 89.0 |
| ("Geon 101" manufactured by the B. F. Goodrich Co.) | |
| Vinyl chloride-vinylidene chloride copolymer | 208 |
| ("Geon 202" manufactured by the B. F. Goodrich Co.) (6% vinylidene chloride content) | |
| "Plasticizer SC" | 89.0 |
| (Triethylene glycol ester of mixed saturated monobasic aliphatic acids containing from 6 to 8 carbon atoms) | |
| Antimony oxide | 6.4 |
| Cadmium Red | 7.7 |
| Hoover Brown #5682 | 8.5 |
| (Manufactured by Hoover Colors Inc.) | |

The above ingredients provide approximately 17% of calcined clay, 14% of butadiene-acrylonitrile copolymer, and 69% of vinyl chloride resin, based on the total weight of these three ingredients. These three ingredients constitute 78.1% of the entire composition.

The ingredients set forth under "Preliminary mix" were charged into a Banbury mill (cold) in the order in which they are listed. The batch fused in a few minutes and was dropped.

A portion of this preliminary mix batch was then used in preparing composition in accordance with the formation under "Final mix." The mixing was performed in a Banbury mixer. The preliminary mix was charged first, followed by the Geon 101 and Geon 202, three-fourths of the "Plasticizer SC," the antimony oxide, the stabilizers and the remainder of the "Plasticizer SC" heated to 200° F. The temperature of the charge was permitted to rise to 330° F., whereupon the charge was dropped, the total time of the Banbury cycle being 13 minutes. The charge was permitted to cool, pending calendering operations.

The cooled stock was next warmed in an oven at 240° F., then milled at 312° F., and thereafter calendered out into a simulated leather sheet .022 inch thick, the calender temperature being 330° F. The resultant product had the following excellent properties:

| | |
|---|---|
| Scott tear strength | 134 grams/mil |
| Tensile strength | 2276 pounds per sq. in. |
| Elongation at break | 581 per cent |
| Cold crack | OK after 1 hour at −25° C. |
| Crazing | None at 100% elongation |
| Surface finish | Smooth |

EXAMPLE II

| Preliminary mix: | Parts by weight |
|---|---|
| Butaprene NSP82* | 11.5 |
| Calcium stearate | .5 |
| Silene | 3.0 |
| Calcined clay ("Whitetex") | 22.0 |

| Final mix: | |
|---|---|
| Vinyl chloride-vinylidene chloride copolymer (Geon 202) | 49 |
| Polyvinyl chloride (Geon 101) | 21 |
| Plasticizer SC | 21 |
| Preliminary mix (prepared per the preceding schedule) | 37 |

* A copolymer of 30% acrylonitrile, 70% butadiene, manufactured by The Firestone Tire & Rubber Co.

The above formulation provides approximately 11% of butadiene-acrylonitrile copolymer, 21% of calcined clay, and 68% of vinyl chloride resins, based on the total weight of these ingredients. These three ingredients constitute 80.8% of the entire weight of the composition. The ingredients listed under "Preliminary mix" were compounded together on a cold roll mill until a smooth blend was obtained. The ingredients listed under "Final mix" including the milled "Preliminary mix" prepared as just described, were charged into a Banbury mill in the order in which they are listed, at 300° F., the temperature of the Banbury mill being permitted to rise to 320° F., when the charge was dumped.

The charge was then calendered out into a sheet .020 inch thick on a calender maintained at between 325° and 330° F. The resultant sheet had the following properties:

| | |
|---|---|
| Tensile strength | 1900 pounds per square inch |
| Modulus of elasticity | 1100 pounds per square inch |
| Elongation at break | 500 per cent |
| Tear strength (Scott) | 117 grams/mil |
| Crazing at 100% elongation | None |
| Surface finish | Smooth |

EXAMPLE III

| Preliminary mix: | Parts |
|---|---|
| Calcined clay ("Whitetex") | 11.5 |
| Butadiene-acrylonitrile copolymer (containing 35% acrylonitrile) | 11.5 |
| Precipitated hydrated calcium silicate ("Silene EF") | 4.2 |
| Calcium stearate | 2.1 |

| Final mix: | |
|---|---|
| Vinyl chloride-vinyl acetate copolymer ("Vinylite VYNW," manufactured by the Carbide & Carbon Chemicals Corp., containing 4% vinyl acetate) | 56 |
| Vinyl chloride-vinyl acetate copolymer ("Vinylite VYNS" manufactured by the Carbide & Carbon Chemicals Corp., containing 88.5% vinyl acetate) | 14 |
| Plasticizer SC | 22 |
| Preliminary mix | 29.3 |

The above ingredients provide approximately 12.5% of calcined clay, 12.5% of butadiene-acrylonitrile copolymer and 75% of vinyl chloride resins based on the weight of these three ingredients, which in turn constitute 76.6% of the entire composition.

The ingredients listed under "Preliminary mix" were compounded in a Banbury mill (cold) until a homogeneous blend was attained, whereupon the charge was dropped. The ingredients listed under "Final mix" (including the milled "Preliminary mix") were then charged in the order in which they are listed into a Banbury at 300° F., milling being continued until the temperature of the machine and charge rose to 330° F. The charge was then dropped and calendered at 325° F. into a film .03 inch thick. Following are the properties of the film:

| | |
|---|---|
| Tensile strength | 2100 pounds per square inch |
| Modulus | 900 pounds per square inch |
| Elongation at break | 550 per cent |
| Tear strength (Scott) | 125 grams/mil |
| Crazing | None at 100% elongation |
| Surface finish | Smooth |

What is claimed is:

1. Process which comprises (A) milling, at a temperature below 130° F., a preliminary mix comprising (1) a butadiene-acrylonitrile copolymer containing from 30 to 45% of acrylonitrile and (2) a calcined clay, (B) thereafter milling at from 290 to 340° F. the resultant preliminary mix with (3) a vinyl chloride resin selected from the group consisting of homopolymers of vinyl chloride and copolymers thereof with other unsaturated compounds copolymerizable therewith containing at least 80% of vinyl chloride copolymerized therein, the said ingredients being employed in the following proportions:

| | Per cent |
|---|---|
| Butadiene-acrylonitrile copolymer | 10 to 15 |
| Calcined clay | 10 to 25 |
| Vinyl chloride resin | 60 to 80 | the aforesaid percentages being based on the total weight of these three ingredients, which three ingredients constitute at least 65% of all materials employed, and (C) thereafter calendering out the composition into a leather-like sheet.

2. Process which comprises (A) milling, at a temperature below 130° F., a preliminary mix comprising (1) a butadiene-acrylonitrile copolymer containing from 30 to 45% of acrylonitrile and (2) a calcined clay, (B) thereafter milling at from 290 to 340° F. the resultant preliminary mix with (3) a vinyl chloride resin selected from the group consisting of homopolymers of vinyl chloride and copolymers thereof with other unsaturated compounds copolymerizable therewith containing at least 80% of vinyl chloride copolymerized therein, the said ingredients being employed in the following proportions:

| | Per cent |
|---|---|
| Butadiene-acrylonitrile copolymer | 14 |
| Calcined clay | 17 |
| Vinyl chloride resin | 69 |

3. Process which comprises (A) milling, at a temperature below 130° F., a preliminary mix comprising (1) a butadiene-acrylonitrile copolymer containing from 30 to 45% of acrylonitrile and (2) a calcined clay, (B) thereafter milling at from 290 to 340° F. the resultant preliminary mix with (3) a vinyl chloride resin selected from the group consisting of homopolymers of vinyl chloride and copolymers thereof with other unsaturated compounds copolymerizable therewith containing at least 80% of vinyl chloride copolymerized therein, the said ingredients being employed in the following proportions:

| | Per cent |
|---|---|
| Butadiene-acrylonitrile copolymer | 11 |
| Calcined clay | 21 |
| Vinyl chloride resin | 68 |

4. Process which comprises (A) milling, at a temperature below 130° F., a preliminary mix comprising (1) a butadiene-acrylonitrile copolymer containing from 30 to 45% of acrylonitrile and (2) a calcined clay, (B) thereafter milling at from 290 to 340° F. the resultant preliminary mix with (3) a vinyl chloride resin selected from the group consisting of homopolymers of vinyl chloride and copolymers thereof with other unsaturated compounds copolymerizable therewith containing at least 80% of vinyl chloride copolymerized therein, the said ingredients being employed in the following proportions:

| | Per cent |
|---|---|
| Butadiene-acrylonitrile copolymer | 12.5 |
| Calcined clay | 12.5 |
| Vinyl chloride resin | 75 |

5. A flexible, simulated leather sheeting prepared by the process of claim 1 and being characterized by a smooth surface, high tear strength and freedom from crazing on elongation.

6. A flexible, simulated leather sheeting prepared by the process of claim 2 and being characterized by a smooth surface, high tear strength and freedom from crazing on elongation.

7. A flexible, simulated leather sheeting prepared by the process of claim 3 and being characterized by a smooth surface, high tear strength and freedom from crazing on elongation.

8. A flexible, simulated leather sheeting prepared by the process of claim 4 and being characterized by a smooth surface, high tear strength and freedom from crazing on elongation.

ELMER C. SCHULE.

REFERENCES CITED

The following references are of record in the file of this patent:

UNITED STATES PATENTS

| Number | Name | Date |
|---|---|---|
| 2,330,353 | Henderson | Sept. 28, 1943 |